(12) United States Patent
Villegas

(10) Patent No.: US 12,269,475 B2
(45) Date of Patent: Apr. 8, 2025

(54) USING MAPPING DATA FOR GENERATING PERCEPTION-IMPACTING ENVIRONMENTAL FEATURES FOR AUTONOMOUS VEHICLES

(71) Applicant: GM Cruise Holdings LLC, San Francisco, CA (US)

(72) Inventor: Noel Villegas, Santa Clarita, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 245 days.

(21) Appl. No.: 18/052,627

(22) Filed: Nov. 4, 2022

(65) Prior Publication Data

US 2024/0149881 A1  May 9, 2024

(51) Int. Cl.
*B60W 40/02* (2006.01)
*B60W 60/00* (2020.01)

(52) U.S. Cl.
CPC .......... *B60W 40/02* (2013.01); *B60W 60/001* (2020.02); *B60W 2420/403* (2013.01); *B60W 2420/408* (2024.01); *B60W 2555/20* (2020.02)

(58) Field of Classification Search
CPC ..... B60W 2420/403; B60W 2420/408; B60W 2555/20; B60W 40/02; B60W 60/001
See application file for complete search history.

(56) References Cited

U.S. PATENT DOCUMENTS

| | | | | |
|---|---|---|---|---|
| 10,062,292 B2* | 8/2018 | Blomberg | | G08G 5/0069 |
| 10,239,529 B2* | 3/2019 | Filev | | G08G 1/09675 |
| 11,861,737 B1* | 1/2024 | Bull | | G06Q 10/06315 |
| 12,072,203 B2* | 8/2024 | Sofman | | G01C 21/3469 |
| 2014/0081507 A1* | 3/2014 | Urmson | | B60W 40/06 701/28 |
| 2015/0142250 A1* | 5/2015 | Cavender-Bares | | B25J 5/00 111/200 |
| 2018/0050698 A1* | 2/2018 | Polisson | | G05D 1/0061 |
| 2018/0136005 A1* | 5/2018 | Forutanpour | | G01C 21/3476 |
| 2018/0283895 A1* | 10/2018 | Aikin | | G01C 21/3415 |
| 2018/0341895 A1* | 11/2018 | Kislovskiy | | G06Q 10/06313 |
| 2019/0265712 A1* | 8/2019 | Satzoda | | B60W 40/09 |
| 2019/0294167 A1* | 9/2019 | Kutila | | G08G 1/096827 |
| 2020/0057442 A1* | 2/2020 | Deiters | | G06V 20/58 |
| 2021/0293573 A1* | 9/2021 | Sofman | | G01C 21/3697 |
| 2022/0161815 A1* | 5/2022 | Van Beek | | B60W 60/00274 |

(Continued)

*Primary Examiner* — Tyler J Lee

(57) ABSTRACT

Examples of the present disclosure provide a computer-implemented system, comprising instructions for performing operations including: estimating locations in a region of a map where features associated with water, snow or ice are likely to be formed under certain adverse weather conditions; simulating one of the adverse weather conditions; generating the features associated with the simulated one of the adverse weather conditions at the locations; determining a response of a perception stack of an autonomous vehicle (AV) to the adverse weather conditions observed at the locations; determining a reaction of the AV to the features generated in the region, the reaction of the AV being a function of a configuration of the AV; in response to the reaction, updating the configuration; repeating the determining the reaction and the updating the configuration until a desired reaction is obtained; and exporting a final configuration corresponding to the desired reaction to a physical AV.

20 Claims, 8 Drawing Sheets

(56) References Cited

U.S. PATENT DOCUMENTS

| | | | |
|---|---|---|---|
| 2022/0388545 A1* | 12/2022 | Chae | B60W 60/0015 |
| 2023/0140569 A1* | 5/2023 | Foster | B60W 10/20 |
| | | | 701/400 |

* cited by examiner

USING MAPPING DATA FOR GENERATING PERCEPTION-IMPACTING ENVIRONMENTAL FEATURES FOR AUTONOMOUS VEHICLES

BACKGROUND

1. Technical Field

The present disclosure generally relates to autonomous vehicles (AVs) and, more specifically, a system and a method for using mapping data for generating perception-impacting environmental features for AVs.

2. Introduction

An AV, also known as a self-driving car, a driverless vehicle, and a robotic vehicle, is a motorized vehicle that can navigate without a human driver. AVs use multiple sensors to sense the environment and move without human input. Sensors in an exemplary AV can include camera sensors, light detection and ranging (LIDAR) sensors, and radio detection and ranging (RADAR) sensors, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs. The automation technology in the AVs may also enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. To facilitate this description, like reference numerals designate like structural elements. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
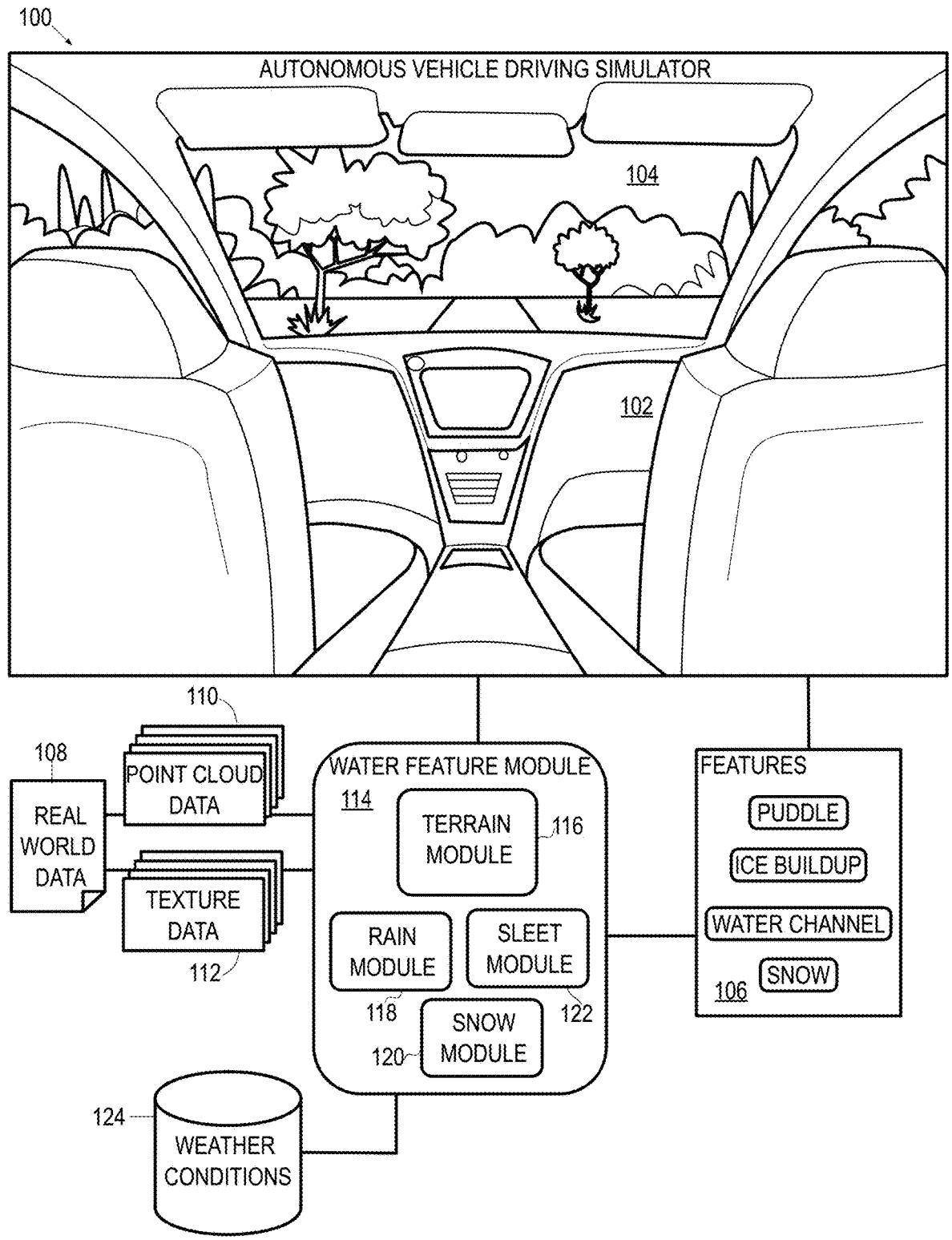
FIG. 1 illustrates a simplified block diagram of an example computer-implemented system for machine learning model training of AVs using mapping data for generating perception-impacting environmental features, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

AVs can provide many benefits. For instance, AVs may have the potential to transform urban living by offering opportunities for efficient, accessible, and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control at an AV may be implemented using a combination of hardware and software components. For instance, an AV stack or AV compute process performing the perception, prediction, planning, and control may be implemented as software code or firmware code. The AV stack or AV compute process may be executed on processor(s) (e.g., general processors, central processors (CPUs), graphical processors (GPUs), digital signal processors (DSPs), ASIC, etc.) and/or any other hardware processing components on the AV. Additionally, the AV stack or AV compute process may communicate with various hardware components (e.g., on-board sensors and control system of the AV) and/or with an AV infrastructure over a network.

Training and testing AVs in the physical world can be challenging. For instance, to provide good testing coverage, an AV may be trained and tested to respond to various driving scenarios (e.g., millions of physical road test scenarios) before it can be deployed in a real-life roadway system. As such, it may be costly and time-consuming to train and test AVs on physical roads. Furthermore, there may be test cases that are difficult to create or too dangerous to cover in the physical world. Accordingly, it may be desirable to train and validate AVs in a simulation environment.

A simulator may simulate (or mimic) real-world conditions (e.g., roads, lanes, buildings, obstacles, other traffic participants, trees, lighting conditions, weather conditions, etc.) so that an AV may be tested in a virtual environment that is close to a real physical world. As used herein the terms "simulated environments," "simulated," "virtual," and "virtual reality environment" may refer to environments, algorithms with instructions for a computing processor, or video displays comprising computer-generated virtual objects or computer-generated virtual objects that are added to a display of a real scene, and may include computer-generated icons, images, or virtual objects. The simulation necessarily involves execution of instructions by a processor, and an output of the simulation may comprise various settings of the AV that enabled its reaction in the simulation to a particular virtual reality environment.

Testing AVs in a simulator can be more efficient and allow for creation of specific traffic scenarios. To that end, the AV compute process implementing the perception, prediction, planning, and control algorithms can be developed, validated, and fine-tuned in a simulation environment. More specifically, the AV compute process may be executed in an AV simulator (simulating various traffic scenarios), and the AV simulator may compute metrics related to AV driving decisions, AV response time, etc. to determine the performance of an AV to be deployed with the AV compute process.

Accordingly, example operations of the present disclosure include: estimating locations in a region of a map where features associated with water, snow or ice have a likelihood of being formed under certain adverse weather conditions, the likelihood being greater than a predetermined threshold (e.g., 60%, 70%, etc.); simulating an adverse weather condition; and generating the features associated with the simulated adverse weather condition at the locations. In a training or testing operation, a response of a perception stack of an AV to the adverse weather condition observed at the locations is determined. A reaction of the AV to the features generated in the region under the simulated adverse weather conditions is also determined. The reaction of the AV may be a function of a configuration of the AV (e.g., configuration of the sensors or the control stack, or other components in the AV). In a training session, in response to the reaction, the configuration of the AV may be updated. The operations may be repeated until a desired reaction is obtained. The final updated configuration corresponding to the desired reaction may be exported to a physical AV. In a testing session, the AV's configuration may be judged according to the reaction of the AV to the simulated adverse weather condition. Such training and/or testing without actual road driving can serve to improve the physical AV's performance on real roads under real adverse weather conditions.

In other aspects of the present disclosure, various specific features may be generated and simulated. For example, a method comprises: selecting a map comprising a region; identifying a topography of the region; estimating a location of at least one of a puddle or a water channel based on the topography; simulating a rainfall condition generating at least one of the puddle or the water channel; selecting a configuration of an AV; and simulating a reaction of the AV according to the configuration to the at least one of the puddle or the water channel in the rainfall condition.

Another example method comprises: selecting a map comprising a region; identifying a topography of the region; simulating a snowfall condition generating snow accumulation; estimating a location of the snow accumulation based on the topography and the snowfall condition; selecting a configuration of an AV; and simulating a reaction of the AV according to the configuration to the snow accumulation in the snowfall condition.

Yet another example method comprises: selecting a map comprising a region; identifying a topography of the region; simulating a sleeting condition generating ice buildup; estimating a location of the ice buildup based on the topography and the sleeting condition; selecting, a configuration of an AV; and simulating a reaction of the AV according to the configuration to the ice buildup in the sleeting condition.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life manufacturing limitations which may cause the features to not look so "ideal" when any of the structures described herein are examined minutely. Note that in the figures, various components are shown as aligned merely for ease of illustration; in actuality, some or all of them may be misaligned. Further, the figures are intended to show relative arrangements of the components within their assemblies, and, in general, such assemblies may include other components that are not illustrated (e.g., various other components related to electrical functionality, or thermal mitigation). For example, in some further examples, the assembly as shown in the figures may include more electrical or thermomechanical components. Additionally, although some components of the assemblies are illustrated in the figures as being planar rectangles or formed of rectangular solids, this is simply for ease of illustration, and examples of these assemblies may be curved, rounded, or otherwise irregularly shaped as dictated by and sometimes inevitable due to the manufacturing processes used to make various components.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112a-112e), such a collection may be referred to herein without the letters (e.g., as "112").

FIG. 1 illustrates a simplified block diagram of an example computer-implemented system 100 for machine learning model training of AVs using mapping data for generating perception-impacting environmental features. System 100, also referred to herein as a simulator 100, can create virtual environment of a scene 104 in which a virtual model of AV 102 can operate with various vehicle configurations, such as speed, acceleration, braking, lights, etc. Scene 104 may be populated with various environmental features 106 (also shortened to simply "features" 106 herein), such as puddles, ice buildup, water channels, snow, etc. that may be generated and located according to the methods described herein to enable learning and tuning of AV configurations for AV 102. Simulator 100 may not only be used to test for safety, but also for scaling to new locations (e.g., cities, streets, neighborhoods, etc.) without having to perform millions of miles of real-world driving tests on the road.

In various examples, simulator 100 may include maps of various localities, such as cities. Scenes 104 may be created using such maps to ensure fidelity to real-world data 108. Scenes 104 may be created to simulate changes to the environment, such as lane changes, street closures, construction, adverse weather events, such as heavy rain, fog, etc. Such scenes 104 may enable testing out new operational design domains and determining optimum AV configurations for the simulated conditions. In various examples, simulator 100 may combine information from perception with heuristics learned from real-world data 108 to recreate a simulation environment that is based on actual road information and real-world conditions. Further, simulator 100 uses machine learning to automatically enter numerous parameters to generate thousands of different scenarios against which AV 102 can be tested. For example, an event that happens rarely may take thousands of road miles to test properly if at all, but in a simulated environment, such rare events can be scalably explored with large-scale parameter spaces to generate test scenarios.

In many examples, test scenarios may also include ways in which AV 102 reacts under various environmental conditions, including adverse weather and road conditions. In one example, puddle formation in inclement weather can impact the perception system of AV 102. Electromagnetic radiation from visible through near-infrared waves (e.g., LIDAR) and through millimeter waves (e.g., RADAR), for example, will reflect off smooth surfaces formed by water pooling and or ice compaction. The resulting specular lobe in this area of the road is significantly narrower than its corresponding diffuse lobe when the road surface is dry. This creates reflections, impacting the perception system of AV 102. These reflections may be innocuous and subsequently ignored by the perception system, however they may also be dangerous, such as reflecting traffic lights, or car headlights, or even humans, causing the perception system to believe there are these objects at locations where there are none. Thus, if the perception systems on AV 102 are not suitably configured to interpret electromagnetic radiation from puddles as such, there is a risk that AV 102 may not react appropriately to the puddle, resulting in unsafe driving behavior such as hard braking, or erratic steering maneuvers around the puddle. Therefore, simulating AV performance in inclement weather in scene 104 that includes puddles can assist in configuring sensor-observable characteristics, such as the returned energy signatures of AV 102. Fusion of high-resolution point cloud from LIDAR systems and camera imagery from camera systems can infer these locations in mapped street data (e.g., statistical roughness can be estimated from camera imagery and centimeter level height information can be assessed from point cloud data).

Real-world data 108 may comprise point cloud data 110 including elevation, slope, height, etc. of particular points on a map. Point cloud data 110 comprises post-processed spatially organized LIDAR data points collected for a given geographical area, terrain, building or space using light detection and ranging, and includes geo-referenced x, y coordinates and z (elevation), as well as other attributes (e.g., intensity, color, laser scan angle, laser time range, global positioning system (GPS) timestamp, etc.) for each point location on a map. Point cloud data 110 can enable estimation of surface heights to centimeter level accuracy in some examples. In some cases, point cloud data 110 may be retrieved from government databases, such as United States Geological Survey (USGS) databases; in other cases, point cloud data 110 may be generated by private agencies or purchased separately and stored in simulator 100.

Real-world data 108 may also include texture data 112 captured from sensors, such as cameras on a real (i.e., physical and not virtual) AV 102. Texture data 112 comprises the distance of a point in pixels from a camera. Texture data 112 post-processed from camera image data of a particular region can give an indication of the surface topography (i.e., three-dimensional quality of the surface) in the region, enabling generation of a "texture map" for instance. Texture data 112 can provide a quantitative measure of local and global arrangements of individual pixels, permitting estimation of surface topography and surface materials, for example, serving to distinguish between a tarred road and a stepped concrete sidewalk. Statistical surface roughness measures can also be estimated from texture data 112 in some examples. The resulting data for a particular region can enable estimation of the region's surface topography for determining whether a puddle is likely to be generated in that region.

Such real-world data 108 may be entered into a water feature module 114 in simulator 100. Water feature module 114 may comprise at least a terrain module 116, a rain module 118, a snow module 120, and a sleet module 122. Other modules associated with other environmental effects are not shown with particularity in FIG. 1 but may also be included in water feature module 114 within the broad scope of the embodiments. The modules facilitate generating an appropriate scene 104 under various environmental conditions for machine leaning model training of AV 102 using simulations. Weather conditions may be retrieved from a weather database 124 external or internal to simulator 100.

In one example, point cloud data 110 and texture data 112 may be analyzed by terrain module 116 to generate elevation and slope of a particular region in a map, such as a street and surrounding areas. Rain module 118 may simulate rainfall and water flow using appropriate analytical techniques for estimating the location of local minima, such as mathematical optimization-based methods as applied to terrain module 116, or physical simulation of water flow based on the elevation and slope from terrain module 116, may predict locations where water puddles are likely to form in the selected region. Such features 106 may be rendered appropriately in the predicted locations in scene 104 during a simulated event.

In a specific example, water feature module 114 and simulator 100 in general may be implemented on various compute engine virtual machines in a cloud computing paradigm using containerized applications managed by an appropriate system that automates deployment, scaling, and management. Real-world data 108 from camera, LIDAR, audio, RADAR and other sensor systems is fed to a cloud storage. Using appropriate artificial intelligence algorithms for scene understanding, various features of any real-world scene are automatically labeled and tagged with many different classes of events, attributes and parameters, generating, for example, point cloud data 110 and texture data 112. From there, highly scalable extract-transform-load (ETL) pipelines and data lakes are used to create and extract petabytes of data quickly and efficiently for water feature module 114. Leveraging a suitably configured database, several exabytes of data can be processed across several million queries to generate an appropriate scene 104 with suitable features 106. Generation of scene 104 may use continuous learning machines to actively mine real-world data 108 to automatically train new models that exceed performance (e.g., predictability) of older models. Simulator 100 uses scenes 104 to recreate any on-road event without manual intervention. Thus, before AV 102 hits the road, its internal systems will have been driving in simulation beforehand, encountering and learning from countless long-tail events (e.g., rare and/or difficult events) in the cloud.

Figure 2A:
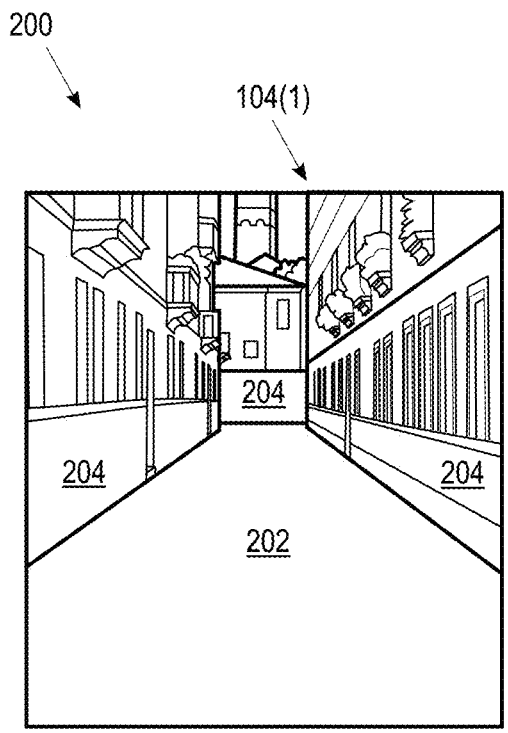
FIGS. 2A and 2B illustrate simplified user interface views of a computer-implemented system for machine learning model training of AVs using mapping data for generating perception-impacting environmental features, according to some examples of the present disclosure.
Figure 2B:
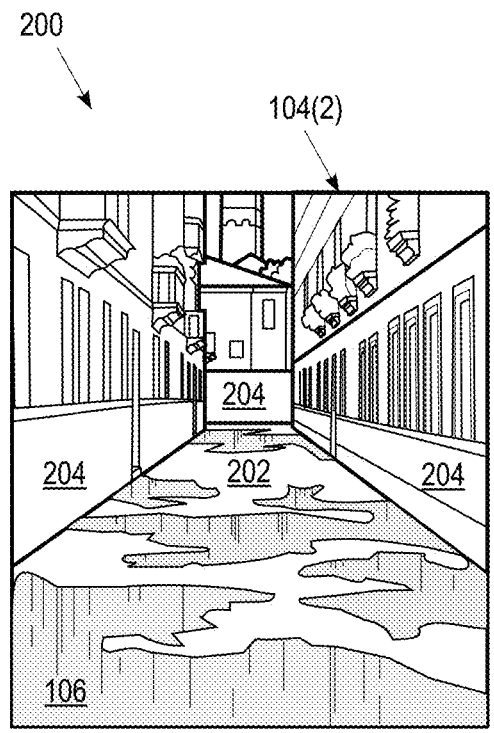

FIGS. 2A and 2B illustrate simplified user interface views 200 of simulator 100 according to some examples of the present disclosure. Note that although user interface views 200 are shown and described, and such visualizations are helpful to debug and analyze a given simulation, simulator 100 may execute simulations without any rendering in a "road bag," comprising a collection of data messages generated by simulated sensors as and when they perceive the simulated world in the form of geometric surfaces and textures. It is to be understood that the description of a rendered image herein also encompasses such unrendered animations to the extent that they impact the configurations of various sensors and operations of simulated AV 102.

As shown in FIG. 2A, an example scene 104(1) under dry conditions may include street 202 bounded by building 204. Street 202 may have a specific surface topography, with local dips and bumps that may be estimated from point cloud data 110 and texture data 112 by terrain module 116 of water feature module 114. A particular simulation of scene 104 after a rain, for example, may include features 106 comprising puddles formed according to the surface topography of street 202, with more water collected in holes and dips. Features 106 such as water channels may also be generated in sloped regions. To generate these features 106, instead of manual intervention, rain module 118 may estimate the regions in street 202 where puddles are likely to form and provide the information to a rendering tool. The rendering tool then automatically renders features 106 including puddles and channels in those regions to create scene 104(2) of a simulation of the same location after a rain, as shown in FIG. 2B. In an example, the rendering tool may use physically based rendering (PBR) to render images by modeling the transport of light on the real world. Example PBR rules for rendering in various examples include: (a) no surface can reflect more light than it receives, (b) surfaces cannot reflect a negative amount of light, (c) the angle of incidence equals the angle of reflection for specular light, (d) light reflects and refracts at the interface of media in accordance with Fresnel equations, (e) light rays behave identically when following the same path, regardless of their direction, etc. Other rendering techniques may also be used appropriately without departing from the broad scope of the present disclosure.

Figure 3:
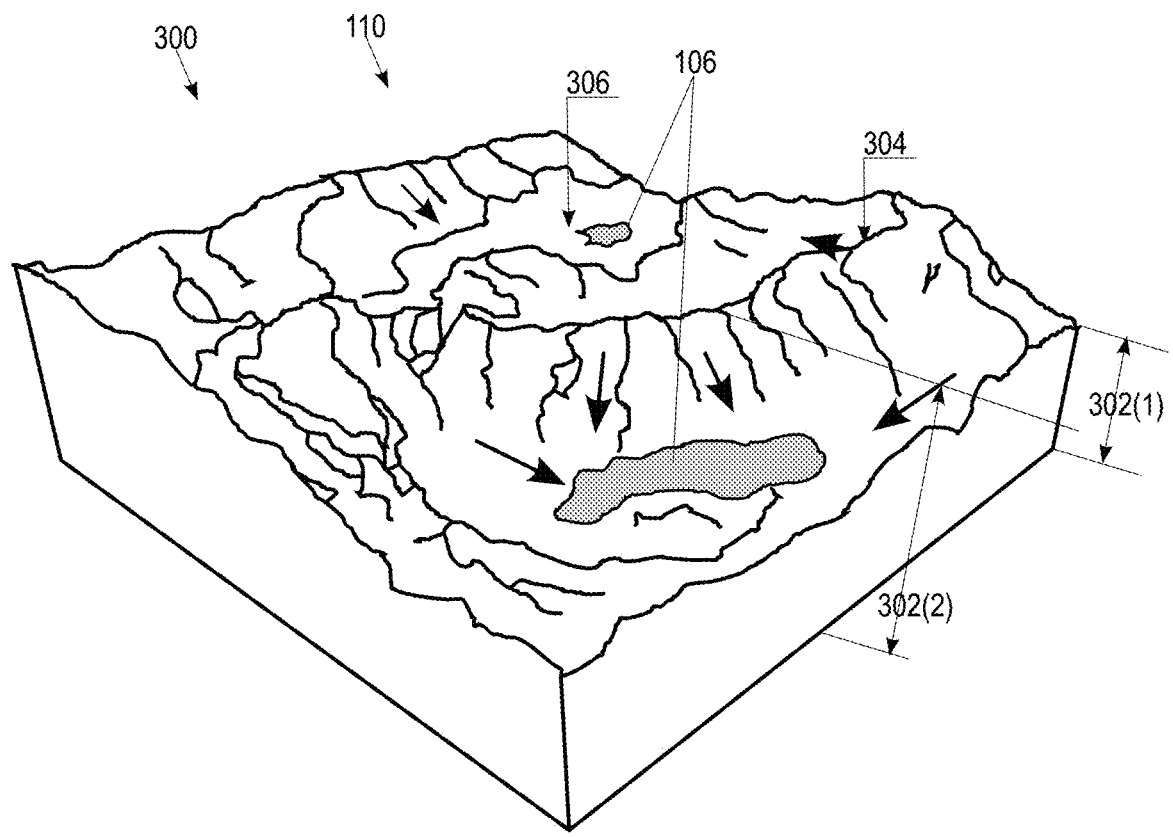
FIG. 3 illustrates a simplified representation of point cloud data used in a computer-implemented system for machine learning model training of AVs using mapping data for generating perception-impacting environmental features, according to some examples of the present disclosure.

FIG. 3 illustrates a simplified representation of point cloud data 110 used in simulator 100, according to some examples of the present disclosure. Point cloud data 110 for a region 300 may include various elevations 302 (e.g., 302(1), 302(2), etc.) of corresponding location points. Elevations 302 may allow determining location points that are crests 304 or troughs 306, for example. Rain module 118 may analyze elevations 302 and determine regions where features 106, such as puddles, are likely to form or otherwise be present according to various algorithms. In one example algorithm, since water tends to flow from crests 304 toward troughs 306, as indicated by the arrows in the figure, feature 106 comprising a puddle may form in a region with relatively lower elevations 302. Rain module 118 may perform a simulation of rain falling on region 300 and estimate the direction of water flow from the simulation to determine potential locations of features 106, such as puddles or water channels. Water channels may be formed in areas that slope from a higher elevation to a lower elevation and are bounded by a locally elevated edge. Snow module 120 may perform a simulation of snow falling on region 300 and estimate the location of features 106, such as ice buildup or areas of snow accumulation.

Figure 4A:
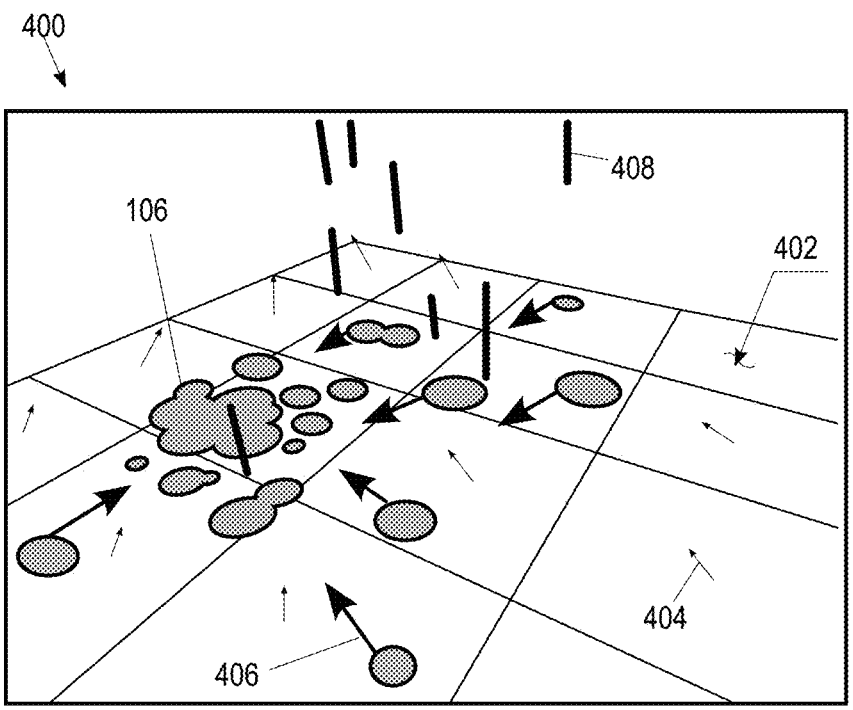
FIG. 4A illustrates a simplified perspective diagram of puddle forming elements used in a computer-implemented system for machine learning model training of AVs using mapping data for generating perception-impacting environmental features, according to some examples of the present disclosure.
Figure 4B:
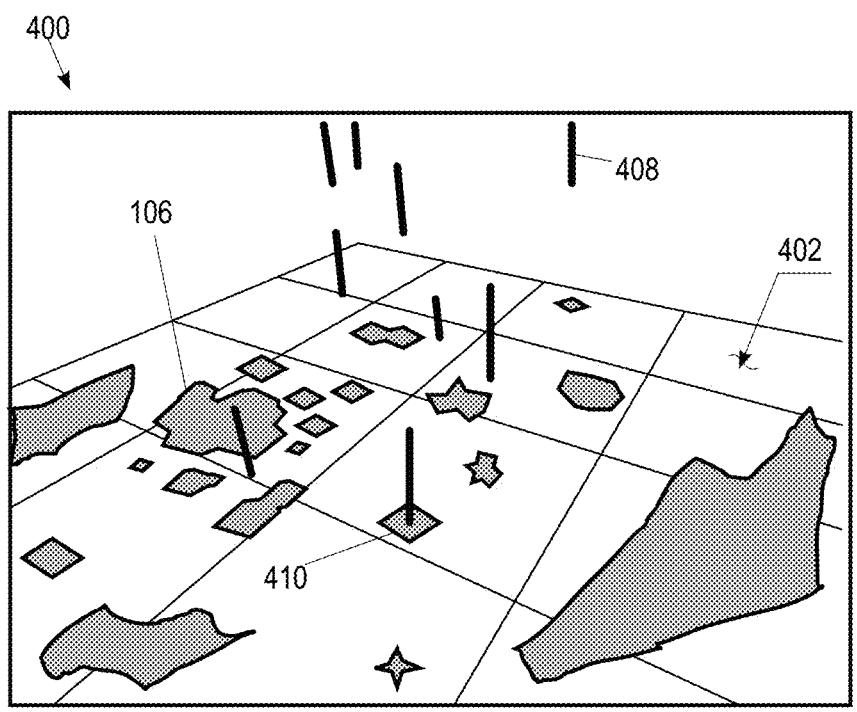
FIG. 4B illustrates a simplified perspective diagram of some other puddle forming elements used in a computer-implemented system for machine learning model training of AVs using mapping data for generating perception-impacting environmental features, according to some examples of the present disclosure.

FIGS. 4A and 4B illustrate simplified perspective diagrams of feature forming elements 400 used in simulator 100, according to some examples of the present disclosure. In various examples, terrain module 116 may identify the topography of a surface 402 in a region from point cloud data 110 and texture data 112. Point cloud data 110 and texture data 112 may be used to determine elevations and surface normals 404 of surface 402 of various areas in the region and provide normal maps of surface 402. Given a geometric surface, the direction of surface normal 404 at a certain point on surface 402 is the vector perpendicular to surface 402 at that point. However, where point cloud data 110 represent a set of point samples on the real surface, the underlying surface normals 404 may be extracted using surface meshing techniques (as shown in the figure), and then computing the surface normals from the mesh, or using approximations to infer surface normals 404 through various techniques. A flow direction 406 may be determined based on slopes of surface normals 404 from a location of relatively higher elevation to another location of relatively lower elevation. Local surface roughness contributing to flow direction 406 may be estimated from texture data 112 as well.

In some examples, rain module 118 may compare the elevations and surface normals 404 of the various areas provided by terrain module 116 and estimate a location of feature 106 comprising a puddle or water channel, for example, based on the relatively lower elevations and sloped surface normals of the location compared to adjacent areas in the region. In some examples, rain module 118 may estimate the location by also determining flow direction 406 of raindrops 408 based on the selected locations. Raindrops 408 falling on surface 402 may tend to flow according to flow direction 406 from a higher elevation to a lower elevation along a slope. A puddle may be estimated to be formed at the location where water flowing according to flow direction 406 collects in an area of relatively lower elevation compared to adjacent areas. A water channel may be estimated to be formed along slopes bounded by local ridges (i.e., edges) parallel to the slopes. In some examples, computational fluid dynamics and optical simulations may be used to analyze and determine flow direction 406 and formation of feature 106.

In some other examples, rain module 118 may perform simulations (e.g., animations, and/or execution of physics engines associated with rainfall, whether or not rendered on a user interface) to estimate the locations, using algorithms and techniques, such as algorithms associated with tracking raindrops 408 as they fall, bounce, flow, etc. In such simulations, flowing raindrops 408 may coalesce into feature 106 comprising a puddle, for example. In another example, where the rate of falling and/or collecting of raindrops 408 is high and the surface topography has local ridges, and troughs, such as a furrow, feature 106 may comprise a water channel. The animation of falling raindrops 408, combined with topography information of surface 402 enables determining locations where feature 106 is likely to form.

Rain module 118 may also simulate rainfall conditions to verify the estimated locations in those examples where the simulation is not used to determine the locations (i.e., other algorithms are used to estimate the locations). In various examples, the rainfall conditions are retrieved from weather conditions database 124 for that region. Rainfall conditions comprise at least an amount of precipitation and rate of precipitation. In some examples, additionally, wind direction may also be retrieved and used to estimate actual points where raindrops 408 contact surface 402. In some examples, raindrops 408 are of a selected shape and fall at a selected speed and angle (e.g., affected by wind), according to predetermined configurations. In other examples, the shape, speed and angle of raindrops 408 may be forced by the selected weather conditions.

In some other examples, areas of low elevation may also enable formation of features 106 comprising ice buildup under sleet or freezing rain conditions. Freezing rain occurs when raindrops 408 do not have enough time to freeze before reaching surface 402; instead, raindrops 408 freeze on contact with surface 402, creating a coating of ice 410 at the point of contact. Over time, feature 106 comprising an ice buildup (e.g., ice patch, icy patch, layer of ice, etc.) may form on surface 402. Sleet is frozen raindrops 408, which freeze before reaching surface 402. Such frozen raindrops 408 also form a coating of ice 420 at the point of contact. Since ice does not flow, sleet module 122 in such examples may not determine any flow direction, but instead may estimate formation of features 106 comprising ice build based on other criteria, such as amount of freezing rain, rate of rainfall, type of surface 402 (e.g., ice forms faster on bridges, overpasses and elevated roads than on surface roads), temperature, bouncing of sleet from surface 402 based on local surface roughness, and other considerations according to animation algorithms for simulating sleet or freezing rain conditions. In some examples, sleet module 122 may determine the surface type of surface 402, for example, from texture data 112.

In some examples, sleet module 122 may calculate a thickness of ice buildup based on the sleeting condition; and select the locations of feature 106 based the surface type of the location, such as bridges, or overpasses, or elevated roads where the thickness of ice buildup may be greater than on surface roads.

Figure 5:
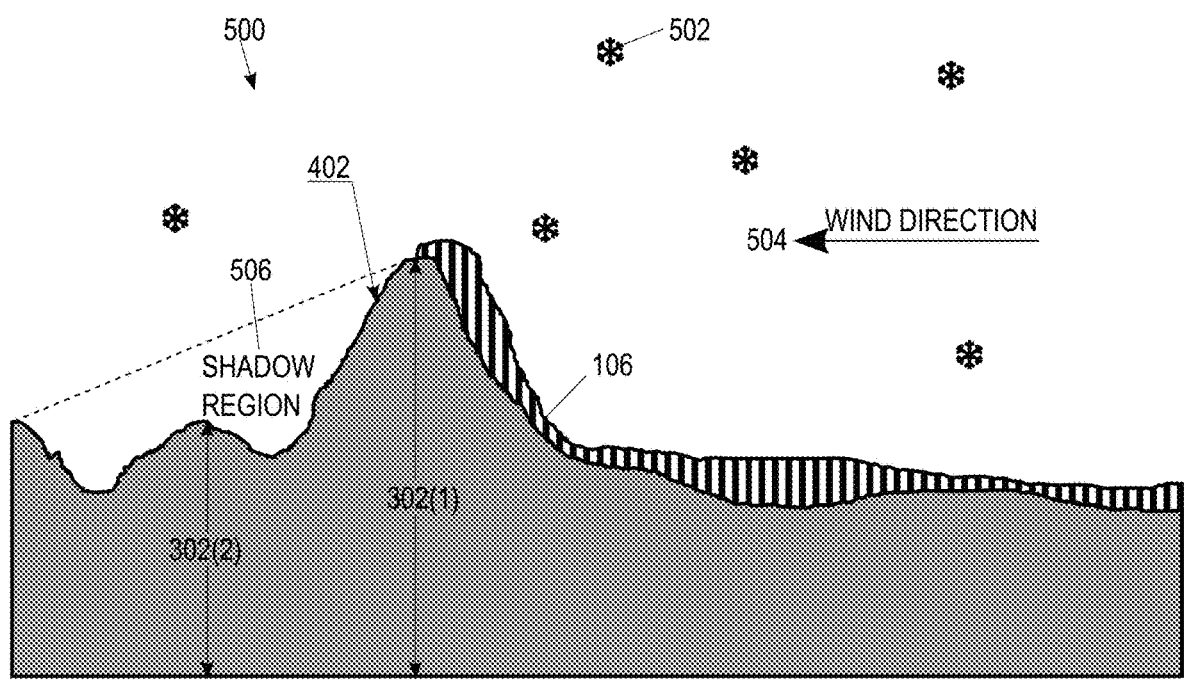
FIG. 5 illustrates a simplified block diagram of reflective elements used in a computer-implemented system for machine learning model training of AVs using mapping data for generating perception-impacting environmental features, according to some examples of the present disclosure.

FIG. 5 illustrates a simplified block diagram of snow drift forming elements 500 used in simulator 100, according to some examples of the present disclosure. In various examples, surface 402 with feature 106 comprising snow 502 may be analyzed by snow module 120. Snow module 120 may compare elevations 302 of various areas in the region based on the topography provided by terrain module 116. For example, a particular area may have elevation 302(1) and another, adjacent area may have elevation 302(2). Snow module 120 may retrieve snowfall conditions from an external weather database in some examples. Snowfall conditions may include amount of precipitation of snow 502, rate of precipitation of snow 502 and wind condition 504. In some examples, wind condition 504 may comprise data such as temperature, pressure, wind direction, characteristics of the prevailing atmospheric river, etc. that governs whether the wind permits snow accumulation or alternatively snow ablation.

Snow module 120 may determine whether the snowfall conditions permit snow accumulation or snow ablation in the various areas, and select locations of feature 106 comprising snow accumulation based on relative elevation of the location and likelihood of snow accumulation compared to snow ablation. In some examples, the likelihood of snow accumulation may depend on antecedent snow depth at the location (e.g., snow covered ground may tend to permit snow accumulation more than bare ground). In some examples snow drift plowing of roads may be simulated to determine locations (and profiles) of snow accumulation. In some examples, the location may also depend on the relative elevations under wind conditions 504. For example, a first area is at elevation 302(1) may be adjacent to a second area at elevation 302(2), elevation 302(1) being greater than elevation 302(2). If wind direction is from the first area to the second area, the second area will be in a shadow region 506, and may get lesser snow accumulation than the first area. On the other hand, if the wind direction is from the second area toward the first area, a portion of the first area (e.g., leeward side) may get lesser snow accumulation than the second area.

In various examples, the locations where feature 106 would tend to form may generated may be based on simulation (e.g., animation) of snow fall according to algorithms and techniques. In general, snow accumulates at higher elevations where temperatures are cooler. Further, snow accumulation in shadow region 506 may be estimated to be less than in other regions under appropriate windy conditions. In some other examples, where the wind does not carry snow, but rather ablates the snow, wind condition 504 may suggest areas of no snow accumulation. Further, initial snow depth may influence whether snow accumulates or melts upon contact with surface 402. Further, details of feature 106, such as shape of the accumulation including local surface effects such as ridges, patches, ripples, etc. may be determined according to data from terrain module 116, wind direction, etc. These local effects may not only affect perception of sensors in AV 102, but also influence reaction of AV 102 on the road.

Figure 6:
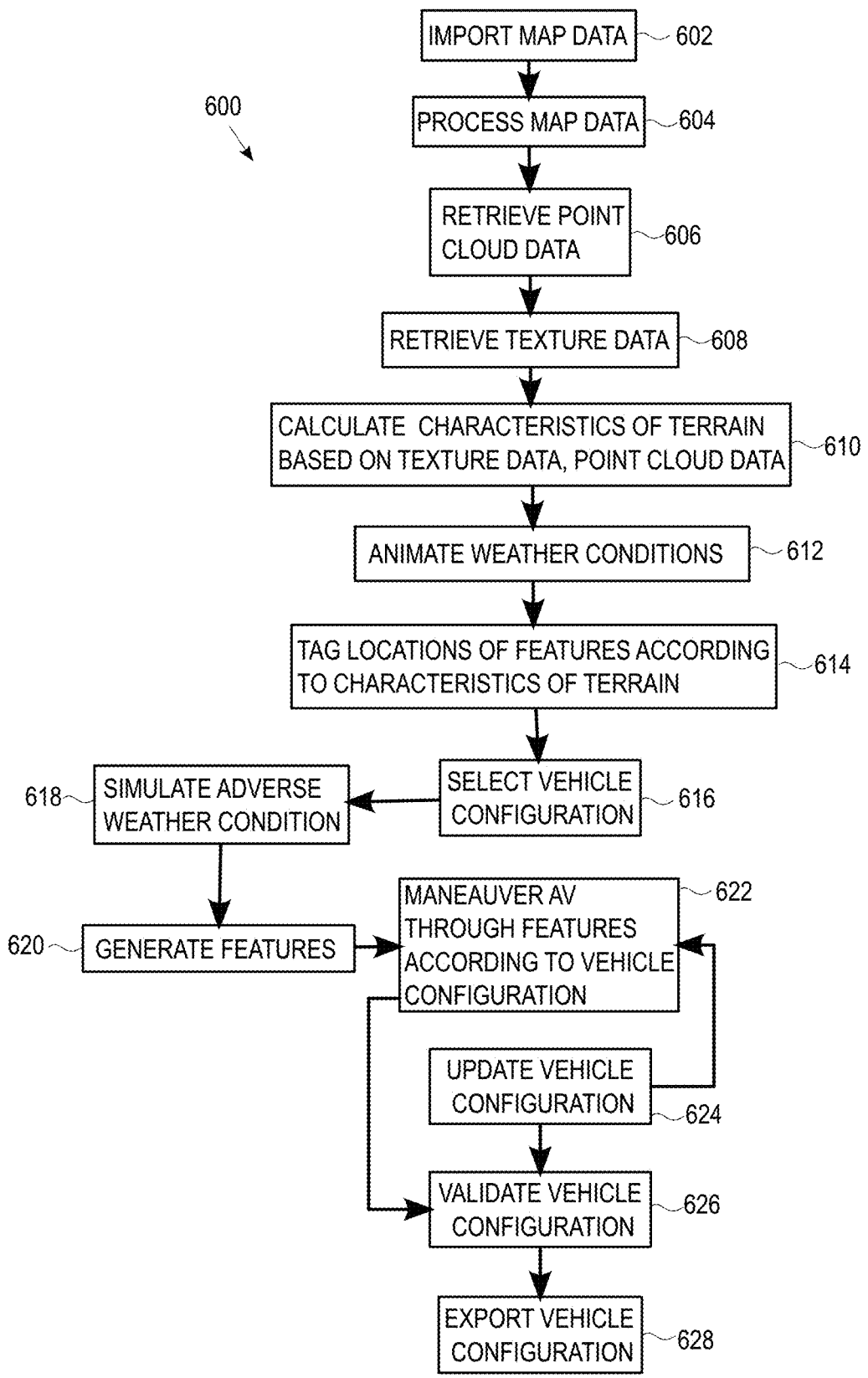
FIG. 6 illustrates a simplified flow diagram illustrating various operations that may be associated with an example computer-implemented system for machine learning model training of AVs using mapping data for generating perception-impacting environmental features, according to some examples of the present disclosure.

FIG. 6 illustrates a simplified flow diagram illustrating various operations 600 that may be associated with simulator 100, according to some examples of the present disclosure. At 602, map data of a particular region for scene 104 may be imported. At 604, the imported map data may be analyzed, for example, to determine associated non-player assets such as buildings, trees, streetlights, etc. to be generated. At 606, point cloud data 110 for the region may be retrieved. At 608, texture data 112 for the region may be retrieved. At 610 water feature module 114 may calculate characteristics of the terrain (e.g., surface 402) in the region based on point cloud data 110 and texture data 112. At 612, water feature module 114 may animate (e.g., simulate, estimate, determine) with or without video rendering weather conditions (e.g., rainfall, snowfall, freezing rain, sleet, etc.) for the region. At 614, water feature module 114 may tag locations in the region where features 106 are likely to form according to characteristics of the terrain and the animated weather conditions as determined by the animation. The tags may include meta-data specifying shape, size, contours, etc. of feature 106.

At 616, a vehicle configuration for AV 102 may be selected. The vehicle configuration may include settings of camera, LIDAR, gear, brake, lights, wipers, control stack, etc. At 618, an adverse weather condition may be simulated by simulator 100. At 620, features 106 may be generated at the tagged areas according to the shape and size of feature 106 as specified in the tag. At 622, AV 102 may be maneuvered by an appropriate simulation through feature 106 according to the vehicle configuration selected. In some examples, a video rendering of the simulation may be made available. In some other examples, a video rendering of the simulation may not be made available, and instead, the reaction of AV 102 may be captured as a series of messages and/or states of various sensors and systems in AV 102. The reaction of AV 102 to generated feature 106 may be determined from the simulation. The reaction may be the behavior of sensors to generated feature 106, for example, the image captured by cameras, or the amount of reflected light captured by LIDAR, or the determination by the control stack of AV 102 to sensor readings in the presence of generated feature 106. In some examples, the vehicle configuration includes settings of sensors in AV 102; simulating the maneuvering of AV 102 may comprise simulating a perception of generated feature 106 by the sensors according to the settings, the reaction of AV 102 being the movement of AV 102 in response to the perception by the sensors. In a particular example, feature 106 may be captured by the camera in AV 102 and identified as a puddle of certain size and shape; in response to this perception by the camera, AV 102 may slow down before reaching the puddle.

In some other examples, the vehicle configuration includes settings of a control stack of AV 102; simulating the maneuvering of AV 102 may comprise simulating control messages by the control stack according to the settings before AV 102 comes in contact with generated feature 106, the reaction of AV 102 being the movement of AV 102 in response to the control messages by the control stack. In a particular example, feature 106 may be identified by sensors of AV 102 as a puddle, and the control stack may be configured to send a control message to the braking system of AV 102 to slow down before AV 102 contacts the puddle.

At 624 the vehicle configuration may be updated if the simulation shows that AV 102 did not react to feature 106 as desired. Operation 622 may be repeated with the updated vehicle configuration. Operations 622 and 624 may be repeated any number of times until a desired vehicle reaction is obtained. The vehicle configuration for the desired reaction may be validated at 626, for example, against manufacturer specifications of sensors and systems, for example, to ensure that the vehicle configuration is feasible and practical. At 628, the validated vehicle configuration may be exported to an artificial intelligence module, which may then upload the vehicle configuration and settings of scene 104 to AV 102.

Operations 600 as described may be repeated any number of times for various adverse weather conditions at 618. In some examples, hurricane force winds may be simulated. In some other examples, light drizzling rain with foggy conditions may be simulated. In some other examples, heavy snow and sleet may be simulated. Various other adverse weather conditions may be simulated based on particular needs. In some examples, the adverse weather conditions simulated may be of a specific safety test. Features 106 may be generated for each such simulation according to the tags and other data as determined by water feature module 114.

Figure 7:
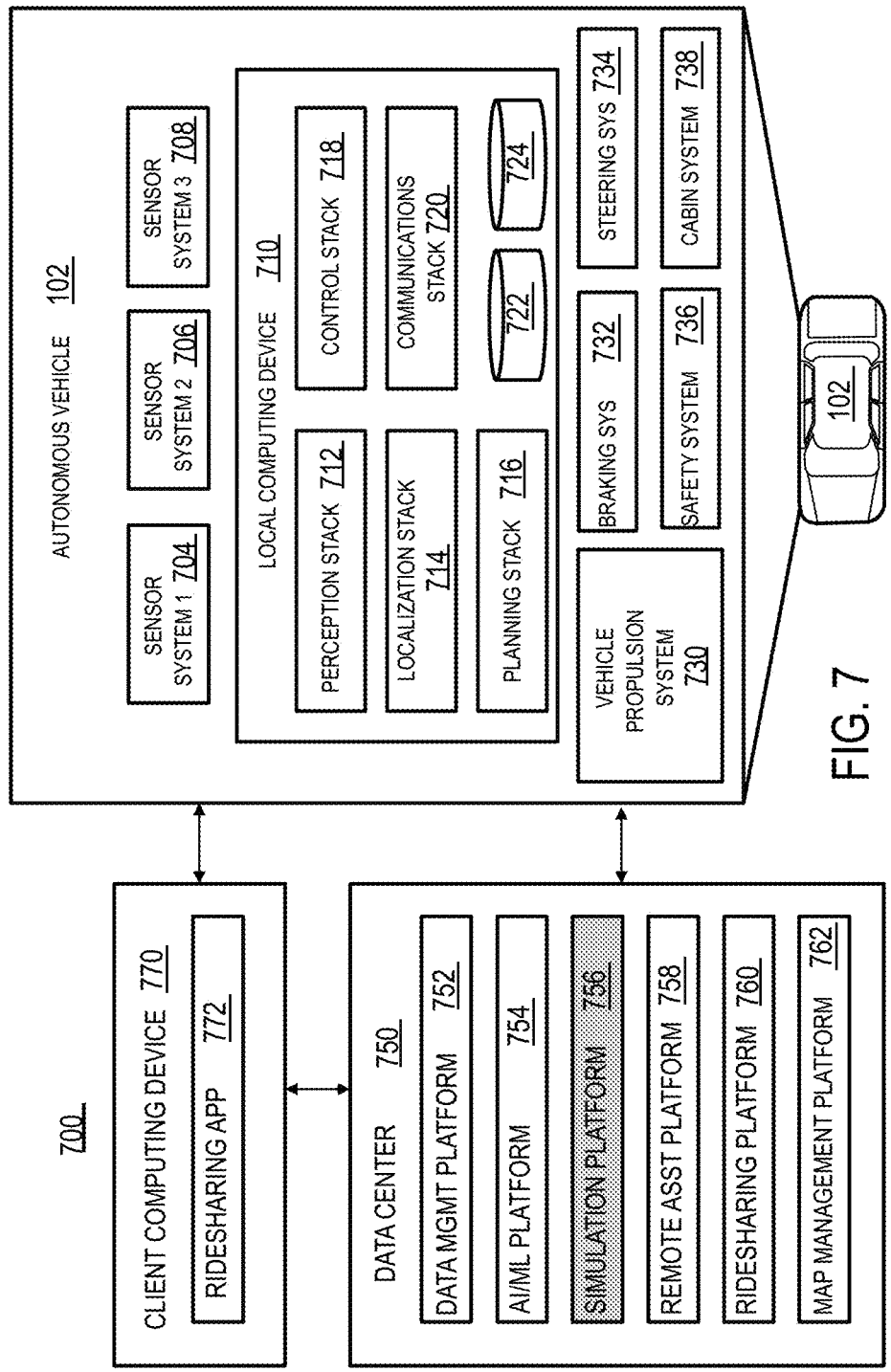
FIG. 7 illustrates an example system environment that can be used to facilitate AV dispatch and operations, according to some aspects of the disclosed technology.

FIG. 7 illustrates an example of an AV management system 700. One of ordinary skill in the art will understand that, for the AV management system 700 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 700 includes an AV 102, a data center 750, and a client computing device 770. The AV 102, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 704, 706, and 708. The sensor systems 704-708 can include different types of sensors and can be arranged about the AV 102. For instance, the sensor systems 704-708 can comprise Inertial Measurement Units (IMUS), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 704 can be a camera system, the sensor system 706 can be a LIDAR system, and the sensor system 708 can be a RADAR system. Other examples may include any other number and type of sensors.

AV 102 can also include several mechanical systems that can be used to maneuver or operate AV 102. For instance, the mechanical systems can include vehicle propulsion system 730, braking system 732, steering system 734, safety system 736, and cabin system 738, among other systems. Vehicle propulsion system 730 can include an electric motor, an internal combustion engine, or both. The braking system 732 can include an engine brake, a wheel braking system (e.g., a disc braking system that utilizes brake pads), hydraulics, actuators, and/or any other suitable componentry configured to assist in decelerating AV 102. The steering system 734 can include suitable componentry configured to control the direction of movement of the AV 102 during navigation. Safety system 736 can include lights and signal indicators, a parking brake, airbags, and so forth. The cabin system 738 can include cabin temperature control systems, in-cabin entertainment systems, and so forth. In some examples, the AV 102 may not include human driver actuators (e.g., steering wheel, handbrake, foot brake pedal, foot accelerator pedal, turn signal lever, window wipers, etc.) for controlling the AV 102. Instead, the cabin system 738 can include one or more client interfaces (e.g., Graphical User Interfaces (GUIs), Voice User Interfaces (VUIs), etc.) for controlling certain aspects of the mechanical systems 730-738.

AV 102 can additionally include a local computing device 710 that is in communication with the sensor systems 704-708, the mechanical systems 730-738, the data center 750, and the client computing device 770, among other systems. The local computing device 710 can include one or more processors and memory, including instructions that can be executed by the one or more processors. The instructions can make up one or more software stacks or components responsible for controlling the AV 102; communicating with the data center 750, the client computing device 770, and other systems; receiving inputs from riders, passengers, and other entities within the AV's environment; logging metrics collected by the sensor systems 704-708; and so forth. In this example, the local computing device 710 includes a perception stack 712 a mapping and localization stack 714, a planning stack 716, a control stack 718, a communications stack 720, a High Definition (HD) geospatial database 722, and an AV operational database 724, among other stacks and systems.

Perception stack 712 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 722, other components of the AV, and other data sources (e.g., the data center 750, the client computing device 770, third-party data sources, etc.). The perception stack 712 can detect and classify objects and determine their current and predicted locations, speeds, directions, and the like. In addition, the perception stack 712 can determine the free space around the AV 102 (e.g., to maintain a safe distance from other objects, change lanes, park the AV, etc.). The perception stack 712 can also identify environmental uncertainties, such as where to look for moving objects, flag areas that may be obscured or blocked from view, and so forth.

Mapping and localization stack 714 can determine the AV's position and orientation (pose) using different methods from multiple systems (e.g., GPS, IMUS, cameras, LIDAR, RADAR, ultrasonic sensors, the HD geospatial database 722, etc.). For example, in some examples, the AV 102 can compare sensor data captured in real-time by the sensor systems 404-408 to data in the HD geospatial database 722 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 716 can determine how to maneuver or operate the AV 102 safely and efficiently in its environment. For example, the planning stack 716 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 716 can determine multiple sets of one or more mechanical operations that the AV 102 can perform (e.g., go straight at a specified speed or rate of acceleration, including maintaining the same speed or decelerating; power on the left blinker, decelerate if the AV is above a threshold range for turning, and turn left; power on the right blinker, accelerate if the AV is stopped or below the threshold range for turning, and turn right; decelerate until completely stopped and reverse; etc.), and select the best one to meet changing road conditions and events. If something unexpected happens, the planning stack 716 can select from multiple backup plans to carry out. For example, while preparing to change lanes to turn right at an intersection, another vehicle may aggressively cut into the destination lane, making the lane change unsafe. The planning stack 716 could have already determined an alternative plan for such an event, and upon its occurrence, help to direct the AV 102 to go around the block instead of blocking a current lane while waiting for an opening to change lanes.

The control stack 718 can manage the operation of the vehicle propulsion system 730, the braking system 732, the steering system 734, the safety system 736, and the cabin system 738. The control stack 718 can receive sensor signals from the sensor systems 704-708 as well as communicate with other stacks or components of the local computing device 710 or a remote system (e.g., the data center 750) to effectuate operation of the AV 102. For example, the control stack 718 can implement the final path or actions from the multiple paths or actions provided by the planning stack 716. This can involve turning the routes and decisions from the planning stack 716 into commands for the actuators that control the AV's steering, throttle, brake, and drive unit.

The communication stack 720 can transmit and receive signals between the various stacks and other components of the AV 102 and between the AV 102, the data center 750, the client computing device 770, and other remote systems. The communication stack 720 can enable the local computing device 710 to exchange information remotely over a network, such as through an antenna array or interface that can provide a metropolitan WI-FI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 720 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 722 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 724 can store raw AV data generated by the sensor systems 404-408 and other components of the AV 102 and/or data received by the AV 102 from remote systems (e.g., the data center 750, the client computing device 770, etc.). In some examples, the raw AV data can include HD LIDAR point cloud data, image or video data, RADAR data, GPS data, and other sensor data that the data center 450 can use for creating or updating AV geospatial data.

The data center 750 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 750 can include one or more computing devices remote to the local computing device 710 for managing a fleet of AVs and AV-related services. For example, in addition to managing the AV 102, the data center 450 may also support a ridesharing service, a delivery service, a remote/roadside assistance service, street services (e.g., street mapping, street patrol, street cleaning, street metering, parking reservation, etc.), and the like.

The data center 750 can send and receive various signals to and from the AV 102 and the client computing device 770. These signals can include sensor data captured by the sensor systems 704-708, roadside assistance requests, software updates, ridesharing pick-up and drop-off instructions, and so forth. In this example, the data center 750 includes one or more of a data management platform 752, an artificial intelligence/Machine Learning (AI/ML) platform 754, a simulation platform 756, a remote assistance platform 758, a ridesharing platform 760, and a map management platform 762, among other systems.

Data management platform 752 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 750 can access data stored by the data management platform 752 to provide their respective services.

The AI/ML platform 754 can provide the infrastructure for training and evaluating machine learning algorithms for operating the AV 102, the simulation platform 756, the remote assistance platform 758, the ridesharing platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The simulation platform 756 can enable testing and validation of the algorithms, machine learning models, neural networks, and other development efforts for the AV 102, the remote assistance platform 758, the ridesharing platform 760, the map management platform 762, and other platforms and systems. The simulation platform 756 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 762; modeling the behavior of other vehicles, bicycles, pedestrians, and other dynamic elements; simulating inclement weather conditions, different traffic scenarios; and so on. In various examples, simulation platform 756 may include simulator 100 and operations associated therewith as described in the preceding figures.

The remote assistance platform 758 can generate and transmit instructions regarding the operation of the AV 102. For example, in response to an output of the AI/ML platform 754 or other system of the data center 750, the remote assistance platform 758 can prepare instructions for one or more stacks or other components of the AV 102.

The ridesharing platform 760 can interact with a customer of a ridesharing service via a ridesharing application 772 executing on the client computing device 470. The client computing device 770 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 772. The client computing device 770 can be a customer's mobile computing device or a computing device integrated with the AV 102 (e.g., the local computing device 710). The ridesharing platform 760 can receive requests to be picked up or dropped off from the ridesharing application 772 and dispatch the AV 102 for the trip.

Map management platform 762 can provide a set of tools for the manipulation and management of geographic and spatial (geospatial) and related attribute data. The data management platform 752 can receive LIDAR point cloud data, image data (e.g., still image, video, etc.), RADAR data, GPS data, and other sensor data (e.g., raw data) from one or more AVs 72, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the AV geospatial data to enable users to view, query, label, edit, and otherwise interact with the data. Map management platform 762 can manage workflows and tasks for operating on the AV geospatial data. Map management platform 762 can control access to the AV geospatial data, including granting or limiting access to the AV geospatial data based on user-based, role-based, group-based, task-based, and other attribute-based access control mechanisms. Map management platform 762 can provide version control for the AV geospatial data, such as to track specific changes that (human or machine) map editors have made to the data and to revert changes when necessary. Map management platform 762 can administer release management of the AV geospatial data, including distributing suitable iterations of the data to different users, computing devices, AVs, and other consumers of HD maps. Map management platform 762 can provide analytics regarding the AV geospatial data and related data, such as to generate insights relating to the throughput and quality of mapping tasks.

In some examples, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, the simulation platform 756 may incorporate the map viewing services for recreating and visualizing certain driving scenarios, the remote assistance platform 758 may incorporate the map viewing services for replaying traffic incidents to facilitate and coordinate aid, the ridesharing platform 760 may incorporate the map viewing services into the client application 772 to enable passengers to view the AV 102 in transit en route to a pick-up or drop-off location, and so on.

Figure 8:
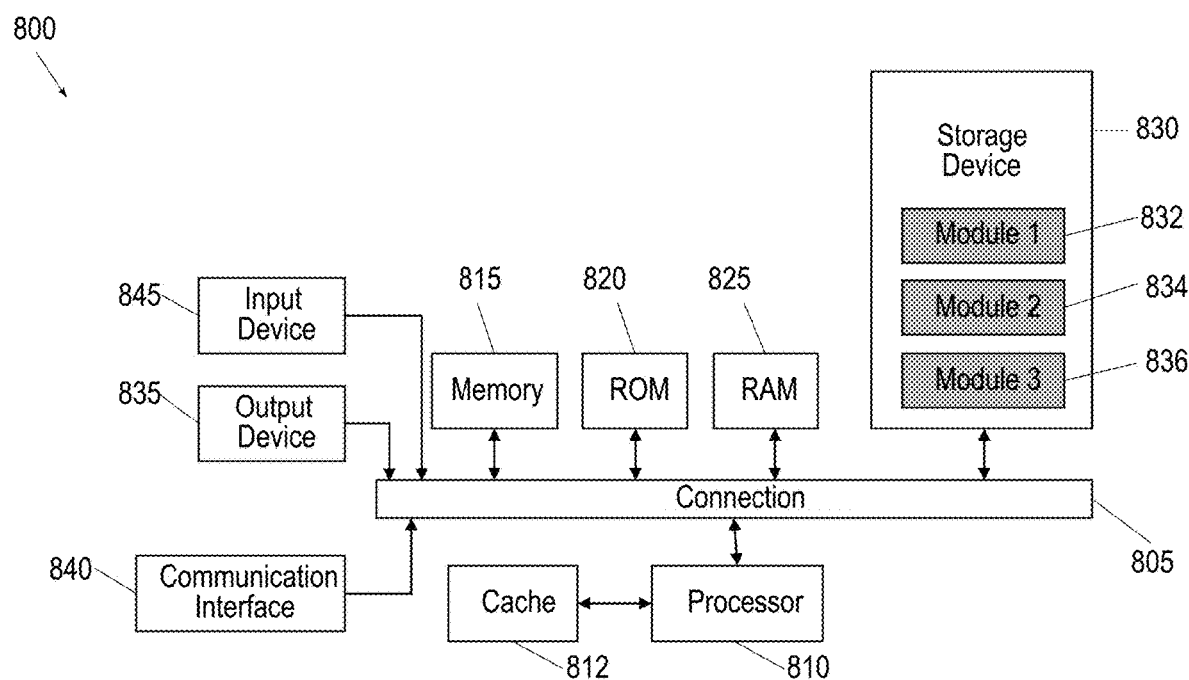
FIG. 8 is a simplified block diagram illustrating various components associated with a computer-implemented simulation system for an AV, according to some examples of the present disclosure.

FIG. 8 illustrates an example processor-based system with which some aspects of the subject technology may be implemented. For example, processor-based system 800 may be any computing device making up, or any component thereof in which the components of the system are in communication with each other using connection 805. Connection 805 may be a physical connection via a bus, or a direct connection into processor 810, such as in a chipset architecture. Connection 805 may also be a virtual connection, networked connection, or logical connection.

In some examples, computing system 800 is a distributed system in which the functions described in this disclosure may be distributed within a datacenter, multiple data centers, a peer network, etc. In some examples, one or more of the described system components represents many such components each performing some or all of the function for which the component is described. In some examples, the components may be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 may include a cache of high-speed memory 812 connected directly with, in close proximity to, or integrated as part of processor 810.

Processor 810 may include any general-purpose processor and a hardware service or software service, such as a module 832 stored in storage device 830, with instructions associated with water feature module 114, configured to control processor 810 as well as a special-purpose processor where software instructions are incorporated into the actual processor design. Other modules 834-836 may include, by way of example and not as limitations, simulation engines, physics engines, etc., including instructions for processor 810 to perform the operations as described in the preceding figures.

Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms known to those of skill in the art. In some instances, multimodal systems may enable a user to provide multiple types of input/output to communicate with computing system 800. Computing system 800 may include communications interface 840, which may generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an (BEACON®) wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more GNSS receivers or transceivers that are used to determine a location of the computing system 800 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be a non-volatile and/or non-transitory and/or computer-readable memory device and may be a hard disk or other types of computer-readable media which may store data that are accessible by a computer, such as magnetic cassettes, flash memory cards, solid-state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Static RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 may include software services, servers, services, etc., that when the code that defines such software is executed by the processor 810, it causes the system 800 to perform a function. In some examples, a hardware service that performs a particular function may include the software component stored in a computer-readable medium in connection with the necessary hardware components, such as processor 810, connection 805, output device 835, etc., to carry out the function.

Examples within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including Personal Computers (PCs), hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 provides a computer-implemented system, comprising: one or more non-transitory computer-readable media storing instructions, when executed by one or more processing units, cause the one or more processing units to perform operations comprising: estimating locations in a region of a map where features associated with water, snow or ice have a likelihood of being formed under certain adverse weather conditions, the likelihood being greater than a predetermined threshold (e.g., 60%, 70%, etc.); simulating one of the adverse weather conditions; generating the features associated with the simulated one of the adverse weather conditions at the locations; and determining a response of a perception stack of an AV to the adverse weather conditions observed at the locations.

Example 2 provides the computer-implemented system of example 1, the operations further comprising: determining a reaction of the AV to the features generated in the region under the one of the adverse weather conditions simulated, the reaction of the AV being a function of a configuration of the AV; in response to the reaction, updating the configuration; repeating the determining the reaction and the updating the configuration until a desired reaction is obtained; and exporting a final updated configuration corresponding to the desired reaction to a physical AV.

Example 3 provides the computer-implemented system of example 2, in which: the configuration includes settings of sensors in the AV, the determining is by simulating a sensing of the features by the sensors according to the settings, and the reaction of the AV comprises at least one of: (i) movement of the AV or (ii) classification of the features by the perception stack in response to the sensing by the sensors.

Example 4 provides the computer-implemented system of any one of examples 2-3, in which: the configuration includes settings of a control stack of the AV, the determining is by simulating control messages by the control stack according to the settings before the AV comes in contact with the features, and the reaction of the AV comprises at least one of: (i) movement of the AV or (ii) classification of the features in response to the control messages by the control stack.

Example 5 provides the computer-implemented system of any one of examples 1-4, in which the features comprise at least one of puddles, water channels, ice buildup, or snow.

Example 6 provides the computer-implemented system of any one of examples 1-5, in which estimating the locations comprises: retrieving point cloud data pertaining to the region; retrieving texture data for the region; calculating characteristics of a terrain of the region based on the point cloud data and the texture data; determining the locations based on the characteristics calculated and types of the features; and tagging the locations.

Example 7 provides the computer-implemented system of example 6, in which the point cloud data is generated by one or more LIDAR systems.

Example 8 provides the computer-implemented system of any one of examples 6-7, in which the texture data is generated by one or more cameras.

Example 9 provides the computer-implemented system of any one of examples 6-8, in which the tagging comprises: generating meta-data specifying type, shape, size, or contours of the corresponding features; and associating the locations with the meta-data.

Example 10 provides the computer-implemented system of any one of examples 6-9, in which the types of the features comprise at least one selected from: puddle, water channel, ice buildup, and snow accumulation.

Example 11 provides the computer-implemented system of any one of example 1-10, in which: the features comprise puddles, and the locations comprise regions of low elevation where water tends to collect.

Example 12 provides the computer-implemented system of any one of examples 1-10, in which: the features comprise water channels, and the locations comprise regions sloping from a higher elevation to a lower elevation and bounded by a locally elevated edge.

Example 13 provides the computer-implemented system of any one of examples 1-10, in which: the features comprise snow accumulation, the locations comprise regions exposed to wind, and the wind permits snow accumulation.

Example 14 provides the computer-implemented system of example 13, in which: a first location is exposed to the wind, a second location is not exposed to the wind, and snow accumulation is more in the first location than in the second location.

Example 15 provides a method, comprising: selecting, by a computer-implemented system, a map comprising a region; identifying, by the computer-implemented system, a topography of the region; estimating, by the computer-implemented system, a location of at least one of a puddle or a water channel based on the topography; simulating, by the computer-implemented system, a rainfall condition generating at least one of the puddle or the water channel; selecting, by the computer-implemented system, a configuration of an AV; and simulating, by the computer-implemented system, a reaction of the AV according to the configuration to the at least one of the puddle or the water channel in the rainfall condition.

Example 16 provides the method of example 15, in which: the configuration includes settings of sensors in the AV, the simulating the reaction of the AV comprises simulating a perception of the at least one of the puddle or the water channel by the sensors according to the settings, and the reaction of the AV comprises movement of the AV in response to the perception by the sensors.

Example 17 provides the method of any one of examples 15-16, in which: the configuration includes settings of a control stack of the AV, the simulating the reaction of the AV comprises simulating control messages by the control stack according to the settings before the AV comes in contact with the at least one of the puddle or the water channel, and the reaction of the AV comprises movement of the AV in response to the control messages by the control stack.

Example 18 provides the method of any one of examples 15-17, in which identifying the topography of the region comprises: retrieving point cloud data of the region; retrieving texture data of the region; and determining elevations and surface normals of various areas in the region.

Example 19 provides the method of any one of examples 15-18, in which estimating the location comprises: comparing elevations and surface normals of various areas in the region based on the topography; and selecting the location based on relatively lower elevations and sloped surface normals of the location compared to adjacent areas in the region.

Example 20 provides the method of example 19, in which estimating the location further comprises determining flow direction of rainwater based on the selected locations.

Example 21 provides the method of example 20, in which the puddle is estimated to be formed at the location where water flowing according to the direction of rainwater collect in an area of relatively lower elevation compared to adjacent areas.

Example 22 provides the method of example 20, in which the water channel is estimated to be formed along slopes bounded by local ridges parallel to the slopes.

Example 23 provides the method of any one of examples 15-22, in which rainfall conditions are retrieved from a weather database for that region.

Example 24 provides the method of any one of examples 15-23, in which rainfall conditions comprise at least amount of precipitation and rate of precipitation.

Example 25 provides a method, comprising: selecting, by a computer-implemented system, a map comprising a region; identifying, by the computer-implemented system, a topography of the region; simulating, by the computer-implemented system, a snowfall condition generating snow accumulation; estimating, by the computer-implemented system, a location of snow accumulation based on the topography and the snowfall condition; selecting, by the computer-implemented system, a configuration of an AV; and simulating, by the computer-implemented system, a reaction of the AV according to the configuration to the snow accumulation in the snowfall condition.

Example 26 provides the method of example 25, in which: the configuration includes settings of sensors in the AV, the simulating the reaction of the AV comprises simulating a perception of the snow accumulation by the sensors according to the settings, and the reaction of the AV comprises movement of the AV in response to the perception by the sensors.

Example 27 provides the method of any one of examples 25-26, in which: the configuration includes settings of a control stack of the AV, the simulating the reaction of the AV comprises simulating control messages by the control stack according to the settings before the AV comes in contact with the snow accumulation, and the reaction of the AV comprises movement of the AV in response to the control messages by the control stack.

Example 28 provides the method of any one of examples 25-27, in which identifying the topography of the region comprises: retrieving point cloud data of the region; retrieving texture data of the region; and determining elevations of various areas in the region.

Example 29 provides the method of any one of examples 25-28, in which estimating the location comprises: comparing elevations of various areas in the region based on the topography; determining whether the snowfall condition permits snow accumulation or snow ablation in the various areas; and selecting the location based on the elevation of the location compared to adjacent areas in the region and a likelihood of snow accumulation compared to snow ablation.

Example 30 provides the method of example 29, in which estimating the location further comprises: determining antecedent snow depth at the location.

Example 31 provides the method of any one of examples 29-30, in which: a first area is at a first elevation, a second area adjacent to the first area is at a second elevation, the second elevation is higher than the first elevation, a wind direction is from the second area toward the first area, and snow accumulation is estimated to be less in the first area than in the second area.

Example 32 provides the method of any one of examples 29-31, in which: a first area is at a first elevation, a second area adjacent to the first area is at a second elevation, the second elevation is higher than the first elevation, a wind direction is from the first area toward the second area, and snow accumulation is estimated to be less in some portions of the second area than in the first area.

Example 33 provides the method of any one of examples 25-32, in which snowfall conditions are retrieved from a weather database for that region.

Example 34 provides the method of any one of examples 25-33, in which snowfall conditions comprise at least amount of precipitation, rate of precipitation, and wind conditions.

Example 35 provides the method of any one of examples 25-34, further comprising estimating a shape and size of the snow accumulation.

Example 36 provides the method of example 35, in which the shape of the snow accumulation comprises local surface effects including ripples or drifts.

Example 37 provides the method of any one of examples 35-36, in which estimating the shape and size is based at least on the topography of the location.

Example 38 provides a method, comprising: selecting, by a computer-implemented system, a map comprising a region; identifying, by the computer-implemented system, a topography of the region; simulating, by the computer-implemented system, a sleeting condition generating ice buildup; estimating, by the computer-implemented system, a location of an ice buildup based on the topography and the sleeting condition; selecting, by the computer-implemented system, a configuration of an AV; and simulating, by the computer-implemented system, a reaction of the AV according to the configuration to the ice buildup in the sleeting condition.

Example 39 provides the method of example 38, in which: the configuration includes settings of sensors in the AV, the simulating the reaction of the AV comprises simulating a perception of the ice buildup by the sensors according to the settings, and the reaction of the AV comprises movement of the AV in response to the perception by the sensors.

Example 40 provides the method of any one of examples 38-39, in which: the configuration includes settings of a control stack of the AV, the simulating the reaction of the AV comprises simulating control messages by the control stack according to the settings before the AV comes in contact with the ice buildup, and the reaction of the AV comprises movement of the AV in response to the control messages by the control stack.

Example 41 provides the method of any one of examples 38-40, in which identifying the topography of the region comprises: retrieving point cloud data of the region; retrieving texture data of the region; and determining a surface type of various areas in the region.

Example 42 provides the method of example 41, in which estimating the location comprises: calculating a thickness of ice buildup based on the sleeting condition; and selecting the location based the surface type of the location.

Example 43 provides the method of any one of examples 41-42, in which the surface type comprises at least one of: surface road, bridge, overpass, and elevated road.

Example 44 provides the method of any one of examples 38-43, in which the sleeting condition comprises at least the following: amount of precipitation, rate of precipitation, and temperature.

Example 45 provides the method of any one of examples 38-44, in which the sleeting condition is retrieved from a weather database for that region.

The various examples described above are provided by way of illustration only and should not be construed to limit the scope of the disclosure. For example, the principles herein apply equally to optimization as well as general improvements. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim.

What is claimed is:

1. A computer-implemented system, comprising:
one or more non-transitory computer-readable media storing instructions, which when executed by one or more processing units, cause the one or more processing units to perform operations comprising:
estimating locations in a region of a map where features associated with water, snow or ice have a likelihood of being formed under certain adverse weather conditions, the likelihood being greater than a predetermined threshold;
simulating one of the adverse weather conditions;
generating the features associated with the simulated one of the adverse weather conditions at the locations; and
determining a response of a perception stack of an autonomous vehicle (AV) to the adverse weather conditions observed at the locations by testing algorithms, machine learning models, and neural networks of the AV, including the perception stack of the AV, encountering the one of the adverse weather conditions that is simulated.

2. The computer-implemented system of claim 1, the operations further comprising:
determining a reaction of the AV to the features generated in the region under the simulated one of the adverse weather conditions, the reaction of the AV being a function of a configuration of the AV;
in response to the reaction, updating the configuration;
repeating the determining the reaction and the updating the configuration until a desired reaction is obtained; and
exporting a final updated configuration corresponding to the desired reaction to a physical AV.

3. The computer-implemented system of claim 2, wherein:
the configuration includes settings of sensors in the AV,
the determining is by simulating a sensing of the features by the sensors according to the settings, and
the reaction of the AV comprises at least one of: (i) movement of the AV or (ii) classification of the features by the perception stack in response to the sensing by the sensors.

4. The computer-implemented system of claim 2, wherein:
the configuration includes settings of a control stack of the AV,
the determining is by simulating control messages by the control stack according to the settings before the AV comes in contact with the features, and
the reaction of the AV comprises at least one of: (i) movement of the AV or (ii) classification of the features in response to the control messages by the control stack.

5. The computer-implemented system of claim 1, wherein the features comprise at least one of puddles, water channels, ice buildup, or snow.

6. The computer-implemented system of claim 1, wherein estimating the locations comprises:
retrieving point cloud data pertaining to the region;
retrieving texture data for the region;
calculating characteristics of a terrain of the region based on the point cloud data and the texture data;
determining the locations based on the characteristics calculated and types of the features; and
tagging the locations.

7. The computer-implemented system of claim 6, wherein:
the point cloud data is generated by one or more light detection and ranging (LIDAR) systems, and,
the texture data is generated by one or more cameras.

8. The computer-implemented system of claim 6, wherein the tagging comprises:
generating meta-data specifying type, shape, size, or contours of the corresponding features; and
associating the locations with the meta-data.

9. A method, comprising:
selecting, by a computer-implemented system, a map comprising a region;
identifying, by the computer-implemented system, a topography of the region;
estimating, by the computer-implemented system, a location of at least one of a puddle or a water channel based on the topography;
simulating, by the computer-implemented system, a rainfall condition generating at least one of the puddle or the water channel;
selecting, by the computer-implemented system, a configuration of an autonomous vehicle (AV); and
simulating, by the computer-implemented system, a reaction of the AV according to the configuration to the at least one of the puddle or the water channel in the rainfall condition by running algorithms, machine learning models, and neural networks of the AV, including a perception stack of the AV, encountering the at least one of the puddle or the water channel in the rainfall condition that is simulated.

10. The method of claim 9, wherein estimating the location comprises:
comparing elevations and surface normals of various areas in the region based on the topography; and
selecting the location based on relatively lower elevations and sloped surface normals of the location compared to adjacent areas in the region.

11. The method of claim 10, wherein estimating the location further comprises determining flow direction of rainwater based on the selected locations.

12. The method of claim 11, wherein the puddle is estimated to be formed at the location where water flowing according to the flow direction of rainwater collect in an area of relatively lower elevation compared to adjacent areas.

13. The method of claim 11, wherein the water channel is estimated to be formed along slopes bounded by local ridges parallel to the slopes.

14. A method, comprising:
selecting, by a computer-implemented system, a map comprising a region;
identifying, by the computer-implemented system, a topography of the region;
simulating, by the computer-implemented system, a snowfall condition generating snow accumulation;
estimating, by the computer-implemented system, a location of snow accumulation based on the topography and the snowfall condition;
selecting, by the computer-implemented system, a configuration of an AV; and
simulating, by the computer-implemented system, a reaction of the AV according to the configuration to the snow accumulation in the snowfall condition by running algorithms, machine learning models, and neural networks of the AV, including a perception stack of the AV, encountering the at least one of the puddle or the water channel in the rainfall condition that is simulated.

15. The method of claim 14, wherein estimating the location comprises:
comparing elevations of various areas in the region based on the topography;
determining whether the snowfall condition permits snow accumulation or snow ablation in the various areas; and
selecting the location based on the elevation of the location compared to adjacent areas in the region and a likelihood of snow accumulation compared to snow ablation.

16. The method of claim 15, wherein estimating the location further comprises:
determining antecedent snow depth at the location.

17. The method of claim 15, wherein:
a first area is at a first elevation,
a second area adjacent to the first area is at a second elevation,
the second elevation is higher than the first elevation,
a wind direction is from the second area toward the first area, and
snow accumulation is estimated to be less in the first area than in the second area.

18. The method of claim 15, wherein:
a first area is at a first elevation,
a second area adjacent to the first area is at a second elevation,
the second elevation is higher than the first elevation,
a wind direction is from the first area toward the second area, and
snow accumulation is estimated to be less in some portions of the second area than in the first area.

19. The method of claim 14, wherein snowfall conditions comprise at least amount of precipitation, rate of precipitation, and wind conditions.

20. The method of claim 19, wherein a shape of the snow accumulation comprises local surface effects including ripples or drifts.

* * * * *